United States Patent
Li et al.

(10) Patent No.: US 10,970,451 B2
(45) Date of Patent: Apr. 6, 2021

(54) INTEGRATED CIRCUIT LAYOUT METHOD, DEVICE, AND SYSTEM

(71) Applicant: TAIWAN SEMICONDUCTOR MANUFACTURING COMPANY, LTD., Hsinchu (TW)

(72) Inventors: Jian-Sing Li, Hsinchu (TW); Ting-Wei Chiang, New Taipei (TW); Hui-Zhong Zhuang, Kaohsiung (TW); Jung-Chan Yang, Longtan Township (TW); Li-Chun Tien, Tainan (TW); Ting Yu Chen, Hsinchu (TW); Tzu-Ying Lin, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/553,958

(22) Filed: Aug. 28, 2019

(65) Prior Publication Data
US 2020/0104446 A1 Apr. 2, 2020

Related U.S. Application Data

(60) Provisional application No. 62/739,018, filed on Sep. 28, 2018.

(51) Int. Cl.
G06F 30/392 (2020.01)
H01L 27/02 (2006.01)

(52) U.S. Cl.
CPC ........ *G06F 30/392* (2020.01); *H01L 27/0207* (2013.01)

(58) Field of Classification Search
CPC .............. G06F 30/392; H01L 27/0207; H01L 21/823821; H01L 2027/11874; H01L 27/0924
See application file for complete search history.

(56) References Cited

U.S. PATENT DOCUMENTS

| 7,260,442 B2 | 8/2007 | Hwang et al. |
| 9,256,709 B2 | 2/2016 | Yu et al. |
| 2014/0040838 A1 | 2/2014 | Liu et al. |
| 2015/0278429 A1 | 10/2015 | Chang |

*Primary Examiner* — Anthony Ho
(74) *Attorney, Agent, or Firm* — Hauptman Ham, LLP

(57) ABSTRACT

A method includes positioning a first active region adjacent to a pair of second active regions in an initial integrated circuit (IC) layout diagram of an initial cell, to align side edges of the first active region and corresponding side edges of each second active region of the pair of second active regions along a cell height direction. The method further includes arranging at least one first fin feature in the first active region, to obtain a modified cell having a modified IC layout diagram. The side edges of the first active region and the corresponding side edges of each second active region extend along the cell height direction. A height dimension of the first active region in the cell height direction is less than half of a height dimension of each second active region of the pair of second active regions in the cell height direction. At least one of the positioning the first active region or the arranging the at least one first fin feature is executed by a processor.

20 Claims, 10 Drawing Sheets

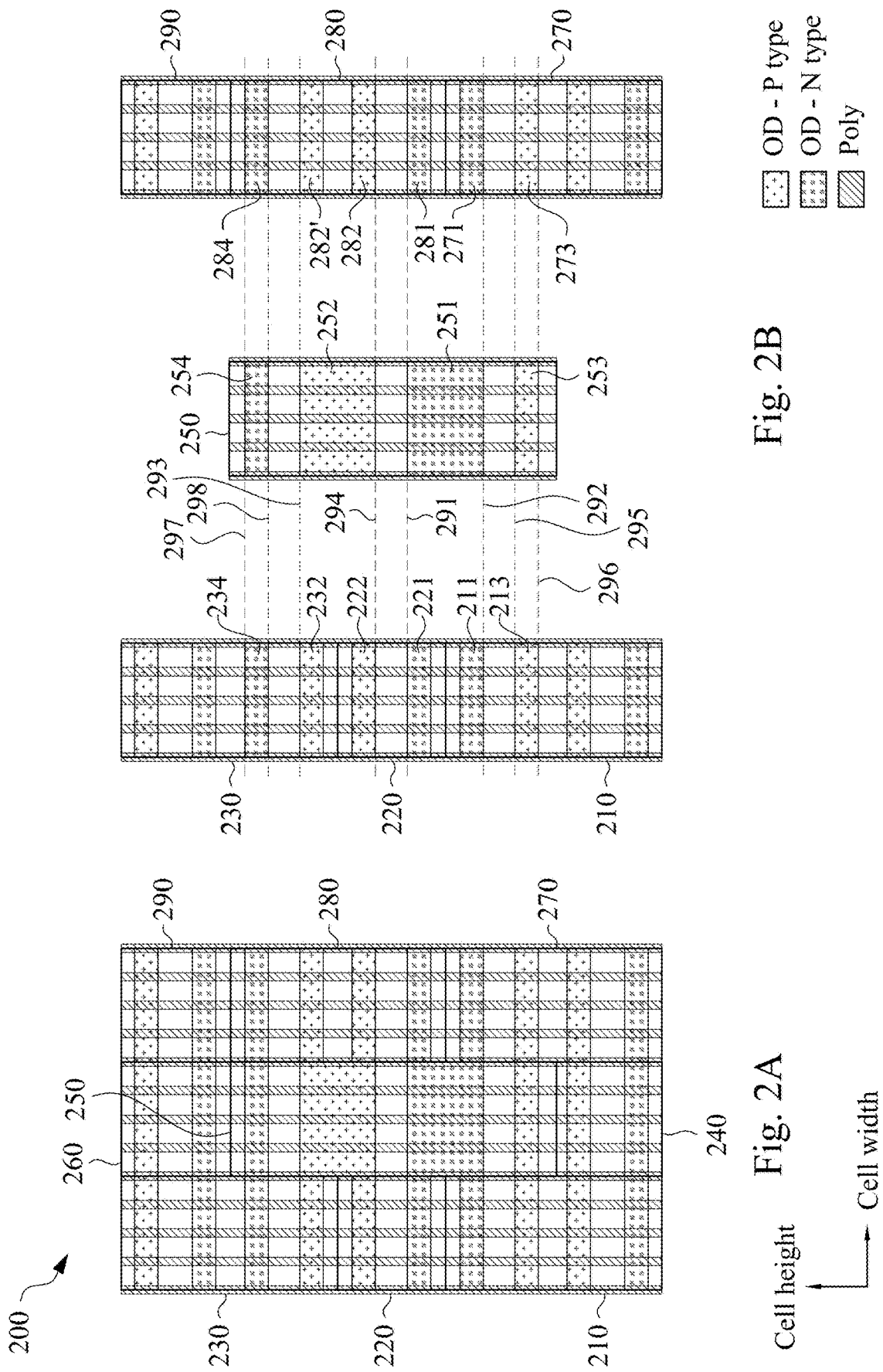

INTEGRATED CIRCUIT LAYOUT METHOD, DEVICE, AND SYSTEM

RELATED APPLICATION(S)

The instant application claims the benefit of U.S. Provisional Application No. 62/739,018, filed Sep. 28, 2018, the entirety of which is incorporated by reference herein.

BACKGROUND

An integrated circuit (IC) typically includes a number of semiconductor devices represented in an IC layout diagram. An IC layout diagram is hierarchical and includes modules which carry out higher-level functions in accordance with the semiconductor device's design specifications. The modules are often built from a combination of cells, each of which represents one or more semiconductor structures configured to perform a specific function.

Cells are configured to provide common, low-level functions, often performed by transistors based on gate regions that intersect active regions, such as source/drain diffusion regions. The elements of a cell are arranged within a cell boundary and electrically connected to other cells through interconnect structures.

Cells having pre-designed layout diagrams, sometimes known as standard cells, are stored in standard cell libraries and accessible by various tools, such as electronic design automation (EDA) tools, to generate, optimize and verify designs for ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is a schematic view of a layout diagram of an IC device including various cells of at least one cell library, in accordance with some embodiments.

FIG. 2B is an exploded view of the layout diagram in FIG. 2A.

DETAILED DESCRIPTION

Figure 1A:
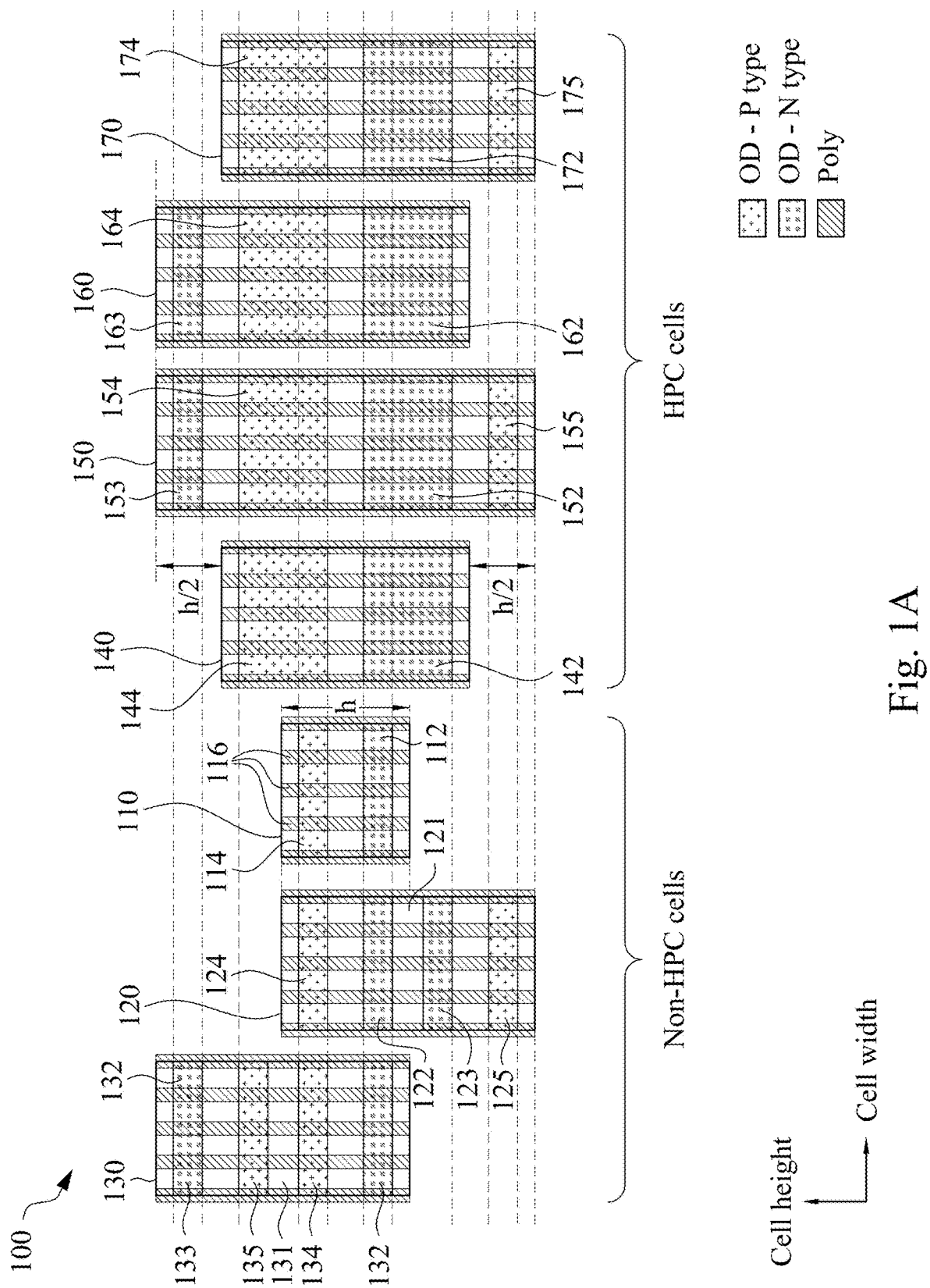
FIGS. 1A-1D are schematic views of layout diagrams of various cells in a cell library, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an IC design process, various standard cells (hereinafter "cells" for simplicity) from one or more standard cell libraries (hereinafter "cell libraries" for simplicity) are placed in an abutting manner to generate a layout diagram for an IC. When cells having different sizes and/or configurations are arranged abutting each other, there are situations in which an empty space (also referred to as "white space"), where no cell is placed, exists in an IC layout diagram. In some embodiments, to reduce the number of such potentially wasteful empty spaces, at least one active region is added to an initial cell to obtain a modified cell. In at least one embodiment, the added active region includes at least one additional fin feature. In a situation where an empty space exists if the initial cell is placed in the IC layout diagram, the modified cell is placed instead, with the added active region filling the otherwise would be empty space. In one or more embodiments, the added active region provides additional functionality and/or improve a property of the IC, without increasing the area of the IC.

FIGS. 1A-1D are schematic views of layout diagrams of various cells in a cell library 100, in accordance with some embodiments.

In the example configuration in FIG. 1A, cell library 100 includes a plurality of cells 110, 120, 130, 140, 150, 160, 170. Each cell includes one or more active regions, and one or more gate regions intersecting the one or more active regions. An active region is an area in which source, drain, and channel features of one or more transistor structures are formed in and/or on a semiconductor substrate. For example, cell 110 includes an active region 112 of a first type (e.g., N-type), an active region 114 of a second type (e.g., P-type) different from the first type, and several gate regions 116 intersecting the active regions 112, 114. The active regions are sometimes referred to as oxide-definition (OD) regions, and are schematically illustrated in the drawings with the label "OD." The gate regions include a conductive material, such as, polysilicon, and are schematically illustrated in the drawings with the label "Poly." Other conductive materials for the gate regions, such as metals, are within the scopes of various embodiments. The gate regions of each cell are elongated along a cell height direction of the cell, which is indicted by a corresponding labelled arrow "cell height" in the drawings. Each cell further has a cell width direction perpendicular to the cell height direction, as indicted by a corresponding labelled arrow "cell width" in the drawings. In one or more embodiments, each active region has one or more fin features arranged therein. Such fin features are elongated in the cell width direction, and spaced from each other along the cell height direction. An example of a fin feature is described with respect to FIG. 6. The described number of active regions, number of gate regions, fin feature arrangement, cell height and cell width are examples. Other configurations are within the scopes of various embodiments.

In some embodiments, the cells in cell library 100 include high performance computing (HPC) cells and non-HPC cells (also referred to as regular cells). In the example configuration in FIG. 1A, regular cells include cells 110, 120, 130, whereas HPC cells include cells 140, 150, 160, 170. Active regions in HPC cells have greater height dimensions in the cell height direction than active regions in regular cells. The higher and correspondingly larger active regions provide the HPC cells with greater capability to perform their intended functionalities than the regular cells.

Specifically, regular cells 110, 120, 130 have active regions 112, 122, 123, 132, 133 of the N-type, and active regions 114, 124, 125, 134, 135 of the P-type. N-type active regions 112, 122, 123, 132, 133 have the same height dimension in the cell height direction, and P-type active regions 114, 124, 125, 134, 135 have the same height dimension in the cell height direction. In an example, the height dimension of N-type active regions 112, 122, 123, 132, 133 is the same as the height dimension of P-type active regions 114, 124, 125, 134, 135. Regular cell 110, which has one N-type active region 112 and one P-type active region 114, has a standard cell height dimension h as indicated in FIG. 1A. Regular cell 120, which has two N-type active regions 122, 123, and two P-type active regions 124, 125, has a cell height dimension 2h, i.e., twice the standard cell height dimension h. Likewise, regular cell 130, which has two N-type active regions 132, 133, and two P-type active regions 134, 135, has a cell height dimension 2h.

HPC cells 140, 150, 160, 170 have active regions with greater height dimensions than those of regular cells 110, 120, 130. Specifically, HPC cells 140, 150, 160, 170 have N-type active regions 142, 152, 162, 172, and P-type active regions 144, 154, 164, 174. Each of N-type active regions 142, 152, 162, 172 of HPC cells 140, 150, 160, 170 has a height dimension corresponding to a sum of height dimensions of two N-type active regions 122, 123 plus a height dimension of a non-active region 121 between N-type active regions 122, 123. As a result, the height dimension of each of N-type active regions 112, 122, 123, 132, 133 of regular cells 110, 120, 130 is less than half of the height dimension of each of N-type active regions 142, 152, 162, 172 of HPC cells 140, 150, 160, 170. Similarly, each of P-type active regions 144, 154, 164, 174 of HPC cells 140, 150, 160, 170 has a height dimension corresponding to a sum of height dimensions of two P-type active regions 134, 135 plus a height dimension of a non-active region 131 between P-type active regions 134, 135. As a result, the height dimension of each of P-type active regions 114, 124, 125, 134, 135 of regular cells 110, 120, 130 is less than half of the height dimension of each of P-type active regions 144, 154, 164, 174 of HPC cells 140, 150, 160, 170.

HPC cells 150, 160 further have N-type active regions 153, 163, respectively, having the same height dimension as N-type active region 133 of regular cell 130. HPC cells 150, 170 further have P-type active regions 155, 175, respectively, having the same height dimension as P-type active region 125 of regular cell 120. As a result, the height dimension of each of active regions 153, 155, 163, 175 is less than half of the height dimension of each of active regions 152, 154, 162, 164, 172, 174 of HPC cells 150, 160, 170. HPC cell 140 has the same cell height dimension 2h as regular cells 120, 130. Due to additional N-type active region 163, HPC cell 160 is higher than HPC cell 140 by h/2, and has a cell height dimension of 2.5h. Similarly, due to additional P-type active region 175, HPC cell 170 is higher than HPC cell 140 by h/2, and has a cell height dimension of 2.5h. HPC cell 150, with two additional active regions 153, 155, is higher than HPC cell 140 by h, and has a cell height dimension of 3h.

In some embodiments, active regions 152, 154 of HPC cell 150, active regions 162, 164 of HPC cell 160, and active regions 172, 174 of HPC cell 170 provide the same functionality as active regions 142, 144 of HPC cell 140, respectively. In one or more embodiments, active regions 152, 154 of HPC cell 150, active regions 162, 164 of HPC cell 160, and active regions 172, 174 of HPC cell 170 are the same as active regions 142, 144 of HPC cell 140, respectively.

Figure 1B:
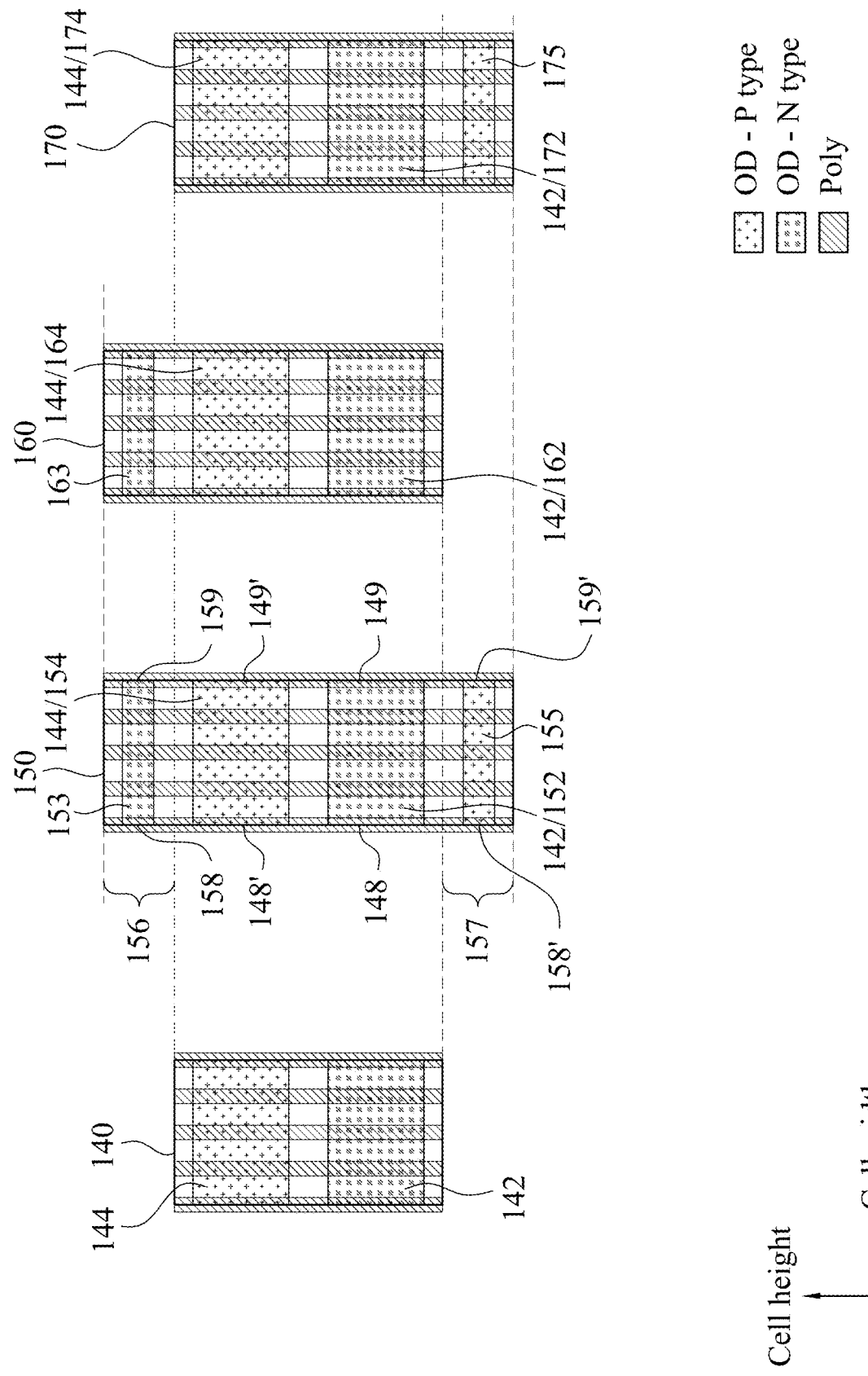

In at least one embodiment, at least one of HPC cells 150, 160, 170 is generated by adding at least one additional active region to HPC cell 140, for example, as illustrated in FIG. 1B.

Figure 6:
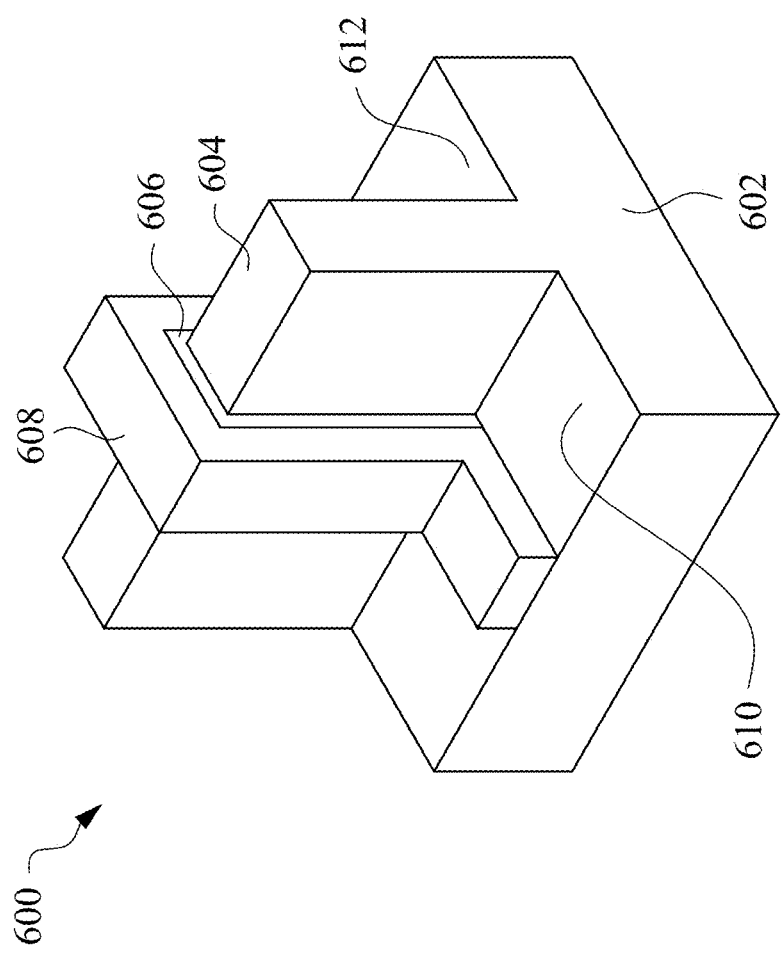
FIG. 6 is a perspective view of an example transistor having a fin feature, in accordance with some embodiments.

In the example configuration in FIG. 1B, cell 140 is an initial cell in cell library 100. A modified cell is generated by modifying cell 140. Specifically, a first active region 153 is positioned adjacent to a pair of second active regions 142, 144 in cell 140, to align side edges of first active region 153 and corresponding side edges of each second active region 142, 144 along the cell height direction. For example, first active region 153 has side edges 158, 159 opposing each other in the cell width direction and extending along the cell height direction, second active region 142 has side edges 148, 149 opposing each other in the cell width direction and extending along the cell height direction, and second active region 144 has side edges 148', 149' opposing each other in the cell width direction and extending along the cell height direction. Side edge 158 of first active region 153 is aligned along the cell height direction with corresponding side edges 148, 148' of second active regions 142, 144, and side edge 159 of first active region 153 is aligned along the cell height direction with corresponding side edges 149, 149' of second active regions 142, 144. Further, at least one fin feature as described with respect to FIG. 6 is arranged in active region 153 to obtain an additional cell area 156. Similarly, a third active region 155 is positioned adjacent to second active regions 142, 144 in cell 140, on a side opposite to first active region 153, to align side edges of third active region 155 and corresponding side edges of each second active region 142, 144 along the cell height direction. For example, third active region 155 has side edges 158', 159' opposing each other in the cell width direction and extending along the cell height direction. Side edge 158' of third active region 155 is aligned along the cell height direction with side edge 158 of first active region 153 and corresponding side edges 148, 148' of second active regions 142, 144, and side edge 159' of third active region 155 is aligned along the cell height direction with side edge 159 of first active region 153 and corresponding side edges 149, 149' of second active regions 142, 144. Further, at least one fin feature as described with respect to FIG. 6 is arranged in active region 155 to obtain an additional cell area 157. A modified cell 150 including initial cell 140, and additional cell areas 156, 157 is obtained. In some embodiments, one additional cell area 156 or 157 is added to initial cell 140, resulting in modified cell 160 or 170, respectively. In one or more embodiments, at least one of modified cells 150, 160, 170 is/are stored in a cell library. In at least one embodiment, at least one of modified cells 150, 160, 170 is/are stored in the same cell library 100 from which initial cell 140 is obtained.

In some embodiments, at least one of additional active regions 153, 155, 163, 175 and/or the corresponding additional fin feature(s) therein is/are configured to provide functionality in addition to the functionality provided by active regions 152, 154, 162, 164, 172, 174 of cells 150, 160, 170. For example, at least one of additional cell areas 156, 157 is configured as a function cell, an engineering change order (ECO) cell, a filler cell, or a physical cell.

A function cell is a cell pre-designed to provide a specific function, e.g., a logic function, to an IC incorporating such a function cell.

An ECO cell is a cell pre-designed without a specific function, but is programmable to provide an intended function. For example, to design an IC, the pre-designed layouts of one or more function cells are read out from a standard cell library and placed into an initial IC layout. The IC layout also includes one or more ECO cells which are not yet connected or routed to the functional cells. When the IC layout is to be revised, one or more of the already placed ECO cells are programed to provide an intended function and routed to the functional cells. The programing of ECO cells involves modifications in one or more layers of the IC layout and/or masks for manufacturing the IC.

A filler cell is a cell with no logical functionality, and is not connected or routed to other cells in an IC layout diagram. A purpose of filler cells is to fill an empty space in a layout diagram, for example, to satisfy one or more design rules, such as minimum spacing between adjacent features.

A physical cell is a cell configured to provide a function, other than a logic function, to an IC incorporating such physical cell. Examples of physical cells include, but are not limited to, a TAP cell as described, for example, with respect to FIG. 1C, and a DCAP cell as described, for example, with respect to FIG. 1D.

Figure 1C:
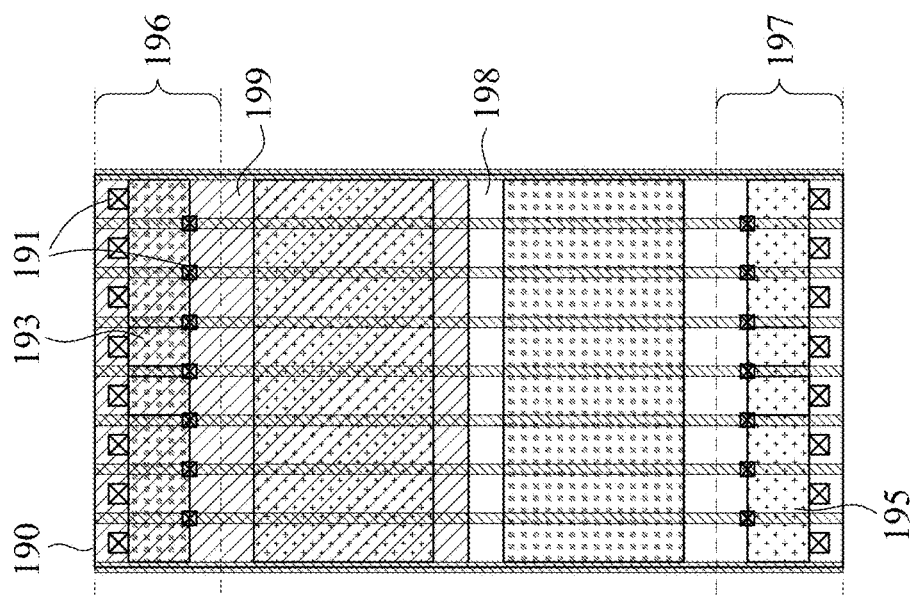

FIG. 1C is a schematic view of a layout diagram of a cell 180. In at least one embodiment, cell 180 corresponds to cell 150. Cell 180 has additional cell areas 186, 187 corresponding to additional cell areas 156, 157, respectively, of cell 150. Each of additional cell areas 186, 187 is configured as a TAP cell to provide a tap of a corresponding power supply voltage VDD or VSS to a corresponding substrate (such as P-type substrate) or well (such as an N-type well). Additional cell area 186 has an additional active region 183 corresponding to additional active region 153 of cell 150, and one or more vias 181 connected to VSS conductor 188. Additional cell area 187 has an additional active region 185 corresponding to additional active region 155 of cell 150, and one or more corresponding vias connected to VDD conductor 189.

Figure 1D:
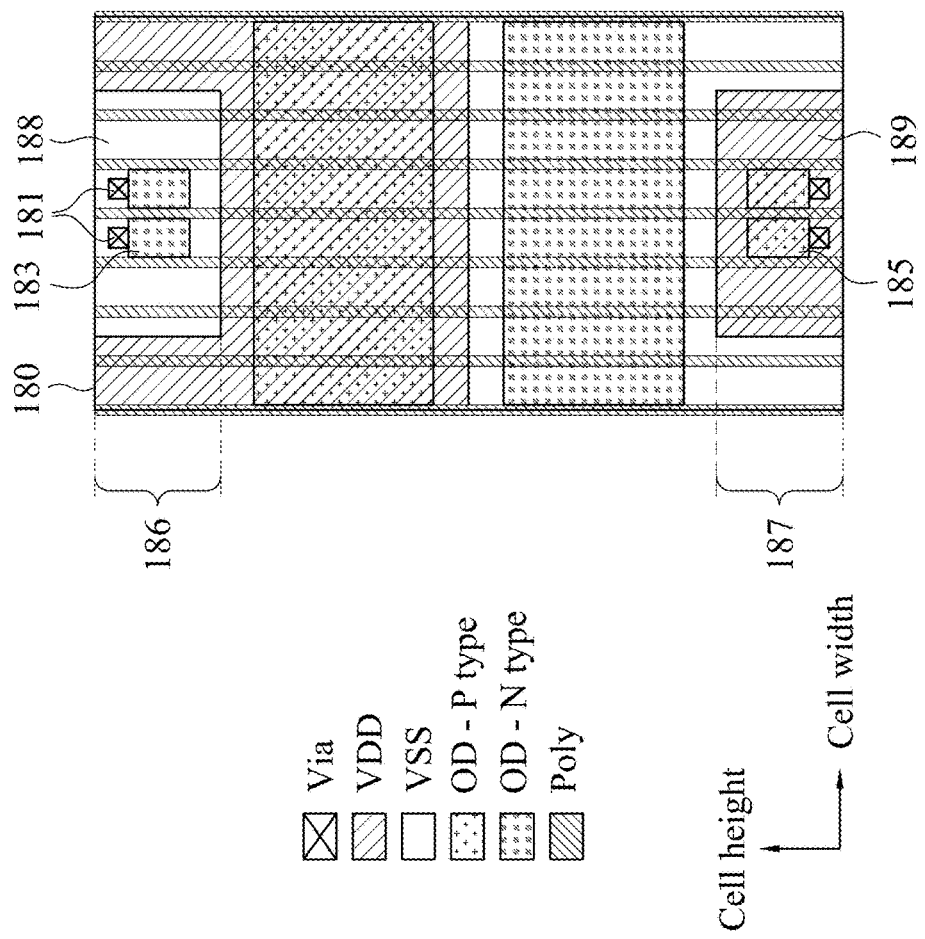

FIG. 1D is a schematic view of a layout diagram of a cell 190. In at least one embodiment, cell 190 corresponds to cell 150. Cell 190 has additional cell areas 196, 197 corresponding to additional cell areas 156, 157, respectively, of cell 150. Each of additional cell areas 196, 197 is configured as a DCAP cell which includes one or more decoupling capacitors (decap) between corresponding conductors 198, 199 of power supply voltages VSS, VDD, respectively. A decoupling capacitor is configured as a charge reservoir to provide additional power in situations where there is a high demand for current from the power supply. Example configurations for decoupling capacitors include an NMOS (n-channel metal-oxide-semiconductor field effect transistor) decap having the source, drain and substrate connected to VSS and the gate connected to VDD, and a PMOS (p-channel metal-oxide-semiconductor field effect transistor) decap having the source, drain and substrate connected to VDD and the gate connected to VSS. In cell 190, additional cell area 196 has an additional active region 193 corresponding to additional active region 153 of cell 150, and one or more vias 191 connecting additional active region 193 and respective gate regions to corresponding power supply voltages to form an NMOS decap. Similarly, additional cell area 197 has an additional active region 195 corresponding to additional active region 155 of cell 150, and one or more corresponding vias connecting additional active region 195 and respective gate regions to corresponding power supply voltages to form a PMOS decap. The above description is an example. Other configurations are within the scopes of various embodiments. For example, in cell 190, one of the additional cell areas, e.g., additional cell area 193, is configured as a TAP cell, whereas the other additional cell area 195 is configured as a DCAP cell.

FIG. 2A is a schematic view of a layout diagram of an IC device 200 including various cells of at least one cell library, in accordance with some embodiments. In the example configuration in FIG. 2A, IC device 200 includes cells 210, 220, 230, 240, 250, 260, 270, 280, 290 placed to abut each other in the cell height direction and the cell width direction. In at least one embodiment, cell 210, 220, 230, 240, 250, 260, 270, 280, 290 correspond to cells 130, 110, 120, 110, 150, 110, 130, 130, 110, respectively, of cell library 100. For simplicity, IC device 200 is described herein with respect to FIG. 2B which is an exploded view of the layout diagram in FIG. 2A. In FIG. 2B, cells 240, 260 are omitted, and cell 250 is illustrated as being spaced in the cell width direction from cells 210, 220, 230 on one side and cells 270, 280, 290 on the other side. However, in IC device 200, cell 250 abuts all other cells 210, 220, 230, 240, 260, 270, 280, 290.

As illustrated in FIG. 2B, cell 250 is placed in the layout diagram of IC device 200 so that, on one side of cell 250, a first active region 251 of cell 250 is aligned, along the cell width direction, with each active region of a pair of first adjacent active regions 211, 221 of adjacent cells 210, 220, respectively. For example, a top edge of first active region 251 is aligned, along the cell width direction, with a top edge of one active region 221 of the pair of first adjacent active regions 211, 221, as shown by line 291. A bottom edge of first active region 251 is aligned, along the cell width direction, with a bottom edge of another active region 211 of the pair of first adjacent active regions 211, 221, as shown by line 292. A distance in the cell height direction between the top edge of one active region 221 and the bottom edge of another active region 211 in the pair of first adjacent active regions 211, 221, i.e., the distance between lines 291, 292, is equal to a height dimension of first active region 251 in the cell height direction. A second active region 252 of cell 250 is aligned, along the cell width direction, with each active region of a pair of second adjacent active regions 222, 232 of adjacent cells 220, 230, respectively. For example, a top edge of second active region 252 is aligned, along the cell width direction, with a top edge of one active region 232 of the pair of second adjacent active regions 222, 232, as shown by line 293. A bottom edge of second active region 252 is aligned, along the cell width direction, with a bottom edge of another active region 222 of the pair of second adjacent active regions 222, 232, as shown by line 294. A distance in the cell height direction between the top edge of one active region 232 and the bottom edge of another active region 222 in the pair of second adjacent active regions 222, 232, i.e., the distance between lines 293, 294, is equal to a height dimension of second active region 252 in the cell height direction. A third active region 253 of cell 250 is aligned, along the cell width direction, with a third adjacent active region 213 of adjacent cell 210. For example, top and bottom edges of third active region 253 are aligned, along the cell width direction, with top and bottom edges, respectively, of third adjacent active region 213, as shown by lines 295, 296, respectively. A fourth active region 254 of cell 250 is aligned, along the cell width direction, with a fourth adjacent active region 234 of adjacent cell 230. For example, top and bottom edges of fourth active region 254 are aligned, along the cell width direction, with top and bottom edges, respectively, of fourth adjacent active region 234, as shown by lines 297, 298, respectively.

On the other side of cell 250, first active region 251 of cell 250 is aligned, along the cell width direction, with each active region of a pair of first adjacent active regions 271, 281 of adjacent cells 270, 280, respectively. For example, the top edge of first active region 251 is aligned, along the cell width direction, with a top edge of one active region 281 of the pair of first adjacent active regions 271, 281, as shown by line 291. The bottom edge of first active region 251 is aligned, along the cell width direction, with a bottom edge of another active region 271 of the pair of first adjacent active regions 271, 281, as shown by line 292. A distance in the cell height direction between the top edge of one active region 281 and the bottom edge of another active region 271 in the pair of first adjacent active regions 271, 281, i.e., the distance between lines 291, 292, is equal to the height dimension of first active region 251 in the cell height direction. Second active region 252 of cell 250 is aligned, along the cell width direction, with each active region of a pair of second adjacent active regions 282, 282' of adjacent cell 280. For example, the top edge of second active region 252 is aligned, along the cell width direction, with a top edge of one active region 282' of the pair of second adjacent active regions 282, 282', as shown by line 293. The bottom edge of second active region 252 is aligned, along the cell width direction, with a bottom edge of another active region 282 of the pair of second adjacent active regions 282, 282', as shown by line 294. A distance in the cell height direction between the top edge of one active region 282' and the bottom edge of another active region 282 in the pair of second adjacent active regions 282, 282', i.e., the distance between lines 293, 294, is equal to the height dimension of second active region 252 in the cell height direction. Third active region 253 of cell 250 is aligned, along the cell width direction, with a third adjacent active region 273 of adjacent cell 270. For example, the top and bottom edges of third active region 253 are aligned, along the cell width direction, with top and bottom edges, respectively, of third adjacent active region 273, as shown by lines 295, 296, respectively. Fourth active region 254 of cell 250 is aligned, along the cell width direction, with a fourth adjacent active region 284 of adjacent cell 280. For example, the top and bottom edges of fourth active region 254 are aligned, along the cell width direction, with top and bottom edges, respectively, of fourth adjacent active region 284, as shown by lines 297, 298, respectively.

As can be seen in FIG. 2A, in the layout diagram of IC device 200, when cell 250 corresponding to cell 150 is placed while being abutted on all sides by other cells 210, 220, 230, 240, 260, 270, 280, 290, there is no empty space left. In contrast, in a situation where a cell with a configuration similar to cell 140 is placed instead of cell 250, there would be two empty spaces at locations corresponding to active regions 253, 254 of cell 250. Thus, in one or more embodiments, placing cell 250 corresponding to cell 150 instead of a cell with a configuration similar to cell 140 eliminates or at least reduces empty spaces, without affecting intended functionality of IC device 200, while providing additional functionality and/or improving a property of IC 200 through additional active regions 234, 254 and/or fin features arranged therein.

Figures 3A, 3B:
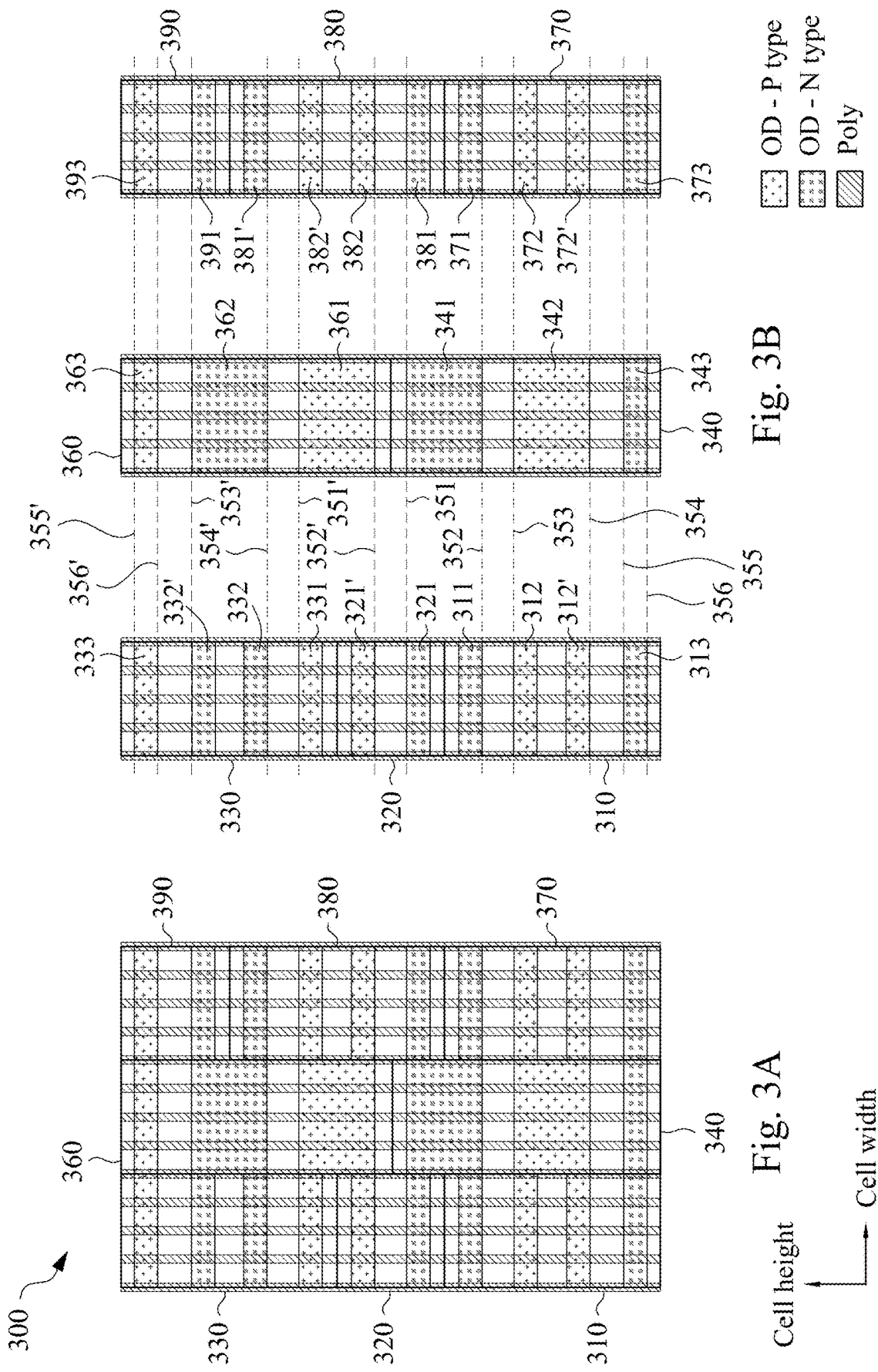
FIG. 3A is a schematic view of a layout diagram of an IC device including various cells of at least one cell library, in accordance with some embodiments.
FIG. 3B is an exploded view of the layout diagram in FIG. 3A.

FIG. 3A is a schematic view of a layout diagram of an IC device 300 including various cells of at least one cell library, in accordance with some embodiments. In the example configuration in FIG. 3A, IC device 300 includes cells 310, 320, 330, 340, 360, 370, 380, 390 placed to abut each other in the cell height direction and the cell width direction. In at least one embodiment, cell 310, 320, 330, 340, 360, 370, 380, 390 correspond to cells 130, 110, 120, 160, 170, 130, 130, 110, respectively, of cell library 100. For simplicity, IC device 300 is described herein with respect to FIG. 3B which is an exploded view of the layout diagram in FIG. 3A. In FIG. 3B, cells 340, 360 are illustrated as being spaced in the cell width direction from cells 310, 320, 330 on one side and cells 370, 380, 390 on the other side. However, in IC device 300, cells 340, 360 abut other cells 310, 320, 330, 370, 380, 390. Compared to IC device 200, IC device 300 is similar in that cells 310, 320, 330, 370, 380, 390 correspond to cells 210, 220, 230, 270, 280, 290, respectively; however, cells 340, 360 replace cells 240, 250, 260.

As illustrated in FIG. 3B, cell 340 is placed in the layout diagram of IC device 300 so that, on one side of cell 340, a first active region 341 of cell 340 is aligned, along the cell width direction, with each active region of a pair of first adjacent active regions 311, 321 of adjacent cells 310, 320, respectively. For example, a top edge of first active region 341 is aligned, along the cell width direction, with a top edge of one active region 321 of the pair of first adjacent active regions 311, 321, as shown by line 351. A bottom edge of first active region 341 is aligned, along the cell width direction, with a bottom edge of another active region 311 of the pair of first adjacent active regions 311, 321, as shown by line 352. A distance in the cell height direction between the top edge of one active region 321 and the bottom edge of another active region 311 in the pair of first adjacent active regions 311, 321, i.e., the distance between lines 351, 352, is equal to a height dimension of first active region 341 in the cell height direction. A second active region 342 of cell 340 is aligned, along the cell width direction, with each active region of a pair of second adjacent active regions 312, 312' of adjacent cell 310. For example, a top edge of second active region 342 is aligned, along the cell width direction, with a top edge of one active region 312 of the pair of second adjacent active regions 312, 312', as shown by line 353. A bottom edge of second active region 342 is aligned, along the cell width direction, with a bottom edge of another active region 312' of the pair of second adjacent active regions 312, 312', as shown by line 354. A distance in the cell height direction between the top edge of one active region 312 and the bottom edge of another active region 312' in the pair of second adjacent active regions 312, 312', i.e., the distance between lines 353, 354, is equal to a height dimension of second active region 342 in the cell height direction. A third active region 343 of cell 340 is aligned, along the cell width direction, with a third adjacent active region 313 of adjacent cell 310. For example, top and bottom edges of third active region 343 are aligned, along the cell width direction, with top and bottom edges, respectively, of third adjacent active region 313, as shown by lines 355, 356, respectively.

On the other side of cell 340, first active region 341 of cell 340 is aligned, along the cell width direction, with each active region of a pair of first adjacent active regions 371, 381 of adjacent cells 370, 380, respectively. For example, the top edge of first active region 341 is aligned, along the cell width direction, with a top edge of one active region 381 of the pair of first adjacent active regions 371, 381, as shown by line 351. The bottom edge of first active region 341 is aligned, along the cell width direction, with a bottom edge of another active region 371 of the pair of first adjacent active regions 371, 381, as shown by line 352. A distance in the cell height direction between the top edge of one active region 381 and the bottom edge of another active region 371 in the pair of first adjacent active regions 371, 381, i.e., the distance between lines 351, 352, is equal to the height dimension of first active region 341 in the cell height direction. Second active region 342 of cell 340 is aligned, along the cell width direction, with each active region of a pair of second adjacent active regions 372, 372' of adjacent cell 370. For example, the top edge of second active region 342 is aligned, along the cell width direction, with a top edge of one active region 372 of the pair of second adjacent active regions 372, 372', as shown by line 353. The bottom edge of second active region 342 is aligned, along the cell width direction, with a bottom edge of another active region 372' of the pair of second adjacent active regions 372, 372', as shown by line 354. A distance in the cell height direction between the top edge of one active region 372 and the bottom edge of another active region 372' in the pair of second adjacent active regions 372, 372', i.e., the distance between lines 353, 354, is equal to the height dimension of second active region 342 in the cell height direction. Third active region 343 of cell 340 is aligned, along the cell width direction, with a third adjacent active region 373 of adjacent cell 370. For example, the top and bottom edges of third active region 343 are aligned, along the cell width direction, with top and bottom edges, respectively, of third adjacent active region 373, as shown by lines 355, 356, respectively.

Cell 360 is placed in the layout diagram of IC device 300 so that, on one side of cell 360, a first active region 361 of cell 360 is aligned, along the cell width direction, with each active region of a pair of first adjacent active regions 321', 331 of adjacent cells 320, 330, respectively. For example, a top edge of first active region 361 is aligned, along the cell width direction, with a top edge of one active region 331 of the pair of first adjacent active regions 321', 331, as shown by line 351'. A bottom edge of first active region 361 is aligned, along the cell width direction, with a bottom edge of another active region 321' of the pair of first adjacent active regions 321', 331, as shown by line 352'. A distance in the cell height direction between the top edge of one active region 331 and the bottom edge of another active region 321' in the pair of first adjacent active regions 321', 331, i.e., the distance between lines 351', 352', is equal to a height dimension of first active region 361 in the cell height direction. A second active region 362 of cell 360 is aligned, along the cell width direction, with each active region of a pair of second adjacent active regions 322, 322' of adjacent cell 330. For example, a top edge of second active region 362 is aligned, along the cell width direction, with a top edge of one active region 332' of the pair of second adjacent active regions 332, 332', as shown by line 353'. A bottom edge of second active region 362 is aligned, along the cell width direction, with a bottom edge of another active region 332 of the pair of second adjacent active regions 332, 332', as shown by line 354'. A distance in the cell height direction between the top edge of one active region 332' and the bottom edge of another active region 332 in the pair of second adjacent active regions 332, 332', i.e., the distance between lines 353', 354', is equal to a height dimension of second active region 362 in the cell height direction. A third active region 363 of cell 360 is aligned, along the cell width direction, with a third adjacent active region 333 of adjacent cell 330. For example, top and bottom edges of third active region 363 are aligned, along the cell width direction, with top and bottom edges, respectively, of third adjacent active region 333, as shown by lines 355', 356', respectively.

On the other side of cell 360, first active region 361 of cell 360 is aligned, along the cell width direction, with each active region of a pair of first adjacent active regions 382, 382' of adjacent cell 380. For example, the top edge of first active region 361 is aligned, along the cell width direction, with a top edge of one active region 382' of the pair of first adjacent active regions 382, 382', as shown by line 351'. The bottom edge of first active region 361 is aligned, along the cell width direction, with a bottom edge of another active region 382 of the pair of first adjacent active regions 382, 382', as shown by line 352'. A distance in the cell height direction between the top edge of one active region 382' and the bottom edge of another active region 382 in the pair of first adjacent active regions 382, 382', i.e., the distance between lines 351', 352', is equal to the height dimension of first active region 361 in the cell height direction. Second active region 362 of cell 360 is aligned, along the cell width direction, with each active region of a pair of second adjacent active regions 381', 391 of adjacent cells 380, 390, respectively. For example, the top edge of second active region 362 is aligned, along the cell width direction, with a top edge of one active region 391 of the pair of second adjacent active regions 381', 391, as shown by line 353'. The bottom edge of second active region 362 is aligned, along the cell width direction, with a bottom edge of another active region 381' of the pair of second adjacent active regions 381', 391, as shown by line 354'. A distance in the cell height direction between the top edge of one active region 391 and the bottom edge of another active region 381' in the pair of second adjacent active regions 381', 391, i.e., the distance between lines 353', 354', is equal to the height dimension of second active region 362 in the cell height direction. Third active region 363 of cell 360 is aligned, along the cell width direction, with a third adjacent active region 393 of adjacent cell 390. For example, the top and bottom edges of third active region 363 are aligned, along the cell width direction, with top and bottom edges, respectively, of third adjacent active region 393, as shown by lines 355', 356', respectively.

As can be seen in FIG. 3A, in the layout diagram of IC device 300, when cells 340, 360 corresponding to cells 160, 170, respectively, are placed in abutment with other cells 310, 320, 330, 370, 380, 390, there is no empty space left. In contrast, in a situation where a cell with a configuration similar to cell 140 is placed instead of cells 340, 360, there would be two empty spaces as described with respect to FIG. 2B. Thus, in one or more embodiments, placing cells 340, 360 corresponding to cells 160, 170, respectively, instead of a cell with a configuration similar to cell 140 eliminates or at least reduces empty spaces, while providing additional functionality and/or improving a property of IC 300 through additional active regions 343, 363 and/or fin features arranged therein.

Figure 4:
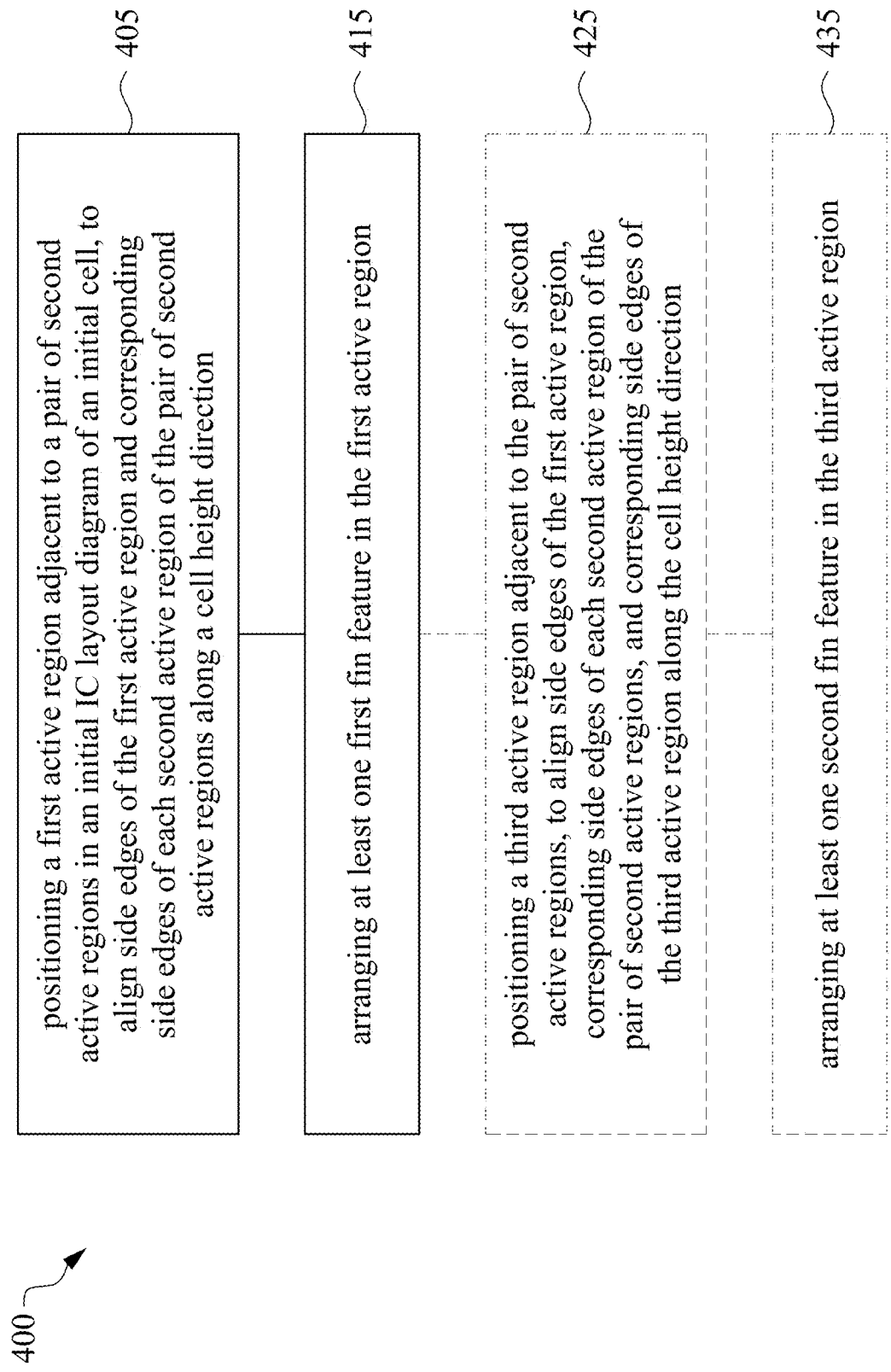
FIG. 4 is a flow chart of a method of generating a layout diagram for a cell in a cell library, in accordance with some embodiments.

FIG. 4 is a flow chart of a method 400 of generating a layout diagram for a cell in a cell library, in accordance with some embodiments. In at least one embodiment, method 400 is performed in whole or in part by a processor as described herein, to generate at least one of cells 150, 160, 170 from cell 140 in cell library 100.

At operation 405, a first active region is positioned adjacent to a pair of second active regions in an initial IC layout diagram of an initial cell, to align side edges of the first active region and corresponding side edges of each second active region of the pair of second active regions along a cell height direction. For example, as described with respect to FIG. 1B, a first active region 163 or 175 is positioned adjacent to a pair of second active regions 142, 144 in an initial IC layout diagram of an initial cell 140, to align side edges of first active region 163 or 175 and corresponding side edges of each second active region 142, 144 along a cell height direction. A height dimension of first active region 163 or 175 in the cell height direction is less than half of a height dimension of each second active region 142, 144.

At operation 415, at least one first fin feature is arranged in the first active region. For example, as described with respect to FIGS. 1B, 1C and 1D, at least one first fin feature (for example, as described with respect to FIG. 6) is arranged in first active region 163 or 175 to provide additional functionality for initial cell 140. As a result, a modified cell 160 or 170 is obtained. In at least one embodiment, at least one of modified cell 160 or 170 is stored in the same cell library 100 as initial cell 140, or in a different cell library.

At optional operation 425, a third active region is positioned adjacent to the pair of second active regions, to align side edges of the first active region, corresponding side edges of each second active region of the pair of second active regions, and corresponding side edges of the third active region along the cell height direction. For example, as described with respect to FIG. 1B, in addition to a first active region 153 positioned adjacent to second active regions 142, 144 in initial cell 140, a third active region 155 is positioned adjacent second active regions 142, 144 to align the side edges of first active region 153, the corresponding side edges of each second active region 142, 144, and side edges of third active region 155 along the cell height direction. A height dimension of first active region 153 and third active region 155 in the cell height direction is less than half of the height dimension of each second active region 142, 144.

At optional operation 435, at least one second fin feature is arranged in the third active region. For example, as described with respect to FIGS. 1B, 1C and 1D, in addition to at least one first fin feature (for example, as described with respect to FIG. 6) arranged in first active region 153, at least one second fin feature (for example, as described with respect to FIG. 6) is arranged in third active region 155 to provide additional functionality for initial cell 140. As a result, a modified cell 150 is obtained. In at least one embodiment, modified cell 150 is stored in the same cell library 100 as initial cell 140, or in a different cell library.

Figure 5:
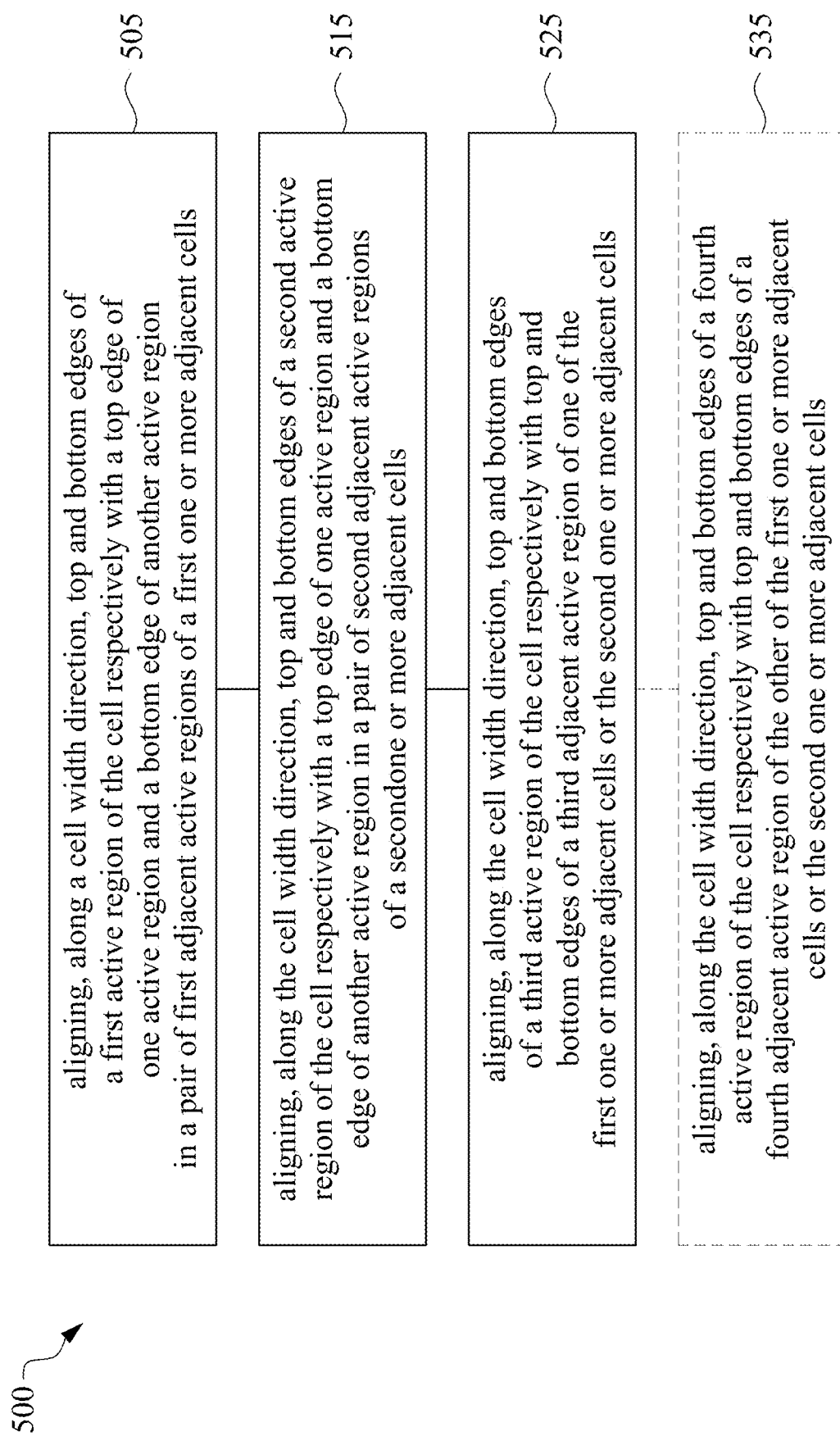
FIG. 5 is a flow chart of a method of generating an IC layout diagram from various cells of at least one cell library, in accordance with some embodiments.

FIG. 5 is a flow chart of a method 500 of generating an IC layout diagram from various cells of at least one cell library, in accordance with some embodiments. In at least one embodiment, method 500 is performed in whole or in part by a processor as described herein, to generate an IC layout diagram of at least one of IC device 200 or IC device 300, from various cells in cell library 100.

At operation 505, top and bottom edges of a first active region of a cell are aligned, along a cell width direction, respectively with a top edge of one active region and a bottom edge of another active region of a pair of first adjacent active regions of a first one or more adjacent cells. For example, as described with respect to FIG. 2B, top and bottom edges of a first active region 251 of a cell 250 are aligned, along the cell width direction, respectively with a top edge of one active region 221 and a bottom edge of another active region 211 of a pair of first adjacent active regions 211, 221 of first and second adjacent cells 210, 220. For another example, as described with respect to FIG. 3B, top and bottom edges of a first active region 361 of a cell 360 are aligned, along the cell width direction, respectively with a top edge of one active region 382' and a bottom edge of another active region 382 of a pair of first adjacent active regions 382, 382' of first adjacent cell 380.

At operation 515, top and bottom edges of a second active region of the cell are aligned, along the cell width direction, respectively with a top edge of one active region and a bottom edge of another active region of a pair of second adjacent active regions of a second one or more adjacent cells. For example, as described with respect to FIG. 2B, top and bottom edges of a second active region 252 of cell 250 are aligned, along the cell width direction, respectively with a top edge of one active region 232 and a bottom edge of another active region 222 of a pair of second adjacent active regions 222, 232 of second and third adjacent cells 220, 230. For another example, as described with respect to FIG. 3B, top and bottom edges of a second active region 362 of cell 360 are aligned, along the cell width direction, respectively with a top edge of one active region 391 and a bottom edge of another active region 381' of a pair of second adjacent active regions 381', 391 of first and second adjacent cells 380, 390.

At operation 525, top and bottom edges of a third active region of the cell are aligned, along the cell width direction, respectively with top and bottom edges of a third adjacent active region of one of the first one or more adjacent cells or the second one or more adjacent cells. For example, as described with respect to FIG. 2B, top and bottom edges of a third active region 253 of cell 250 are aligned, along the cell width direction, respectively with top and bottom edges of a third adjacent active region 213 of first adjacent cell 210. For another example, as described with respect to FIG. 3B, top and bottom edges of a third active region 363 of cell 360 are aligned, along the cell width direction, respectively with top and bottom edges of a third adjacent active region 393 of second adjacent cell 390.

At optional operation 535, top and bottom edges of a fourth active region of the cell are aligned, along the cell width direction, respectively with top and bottom edges of a fourth adjacent active region of the other of the first one or more adjacent cells or the second one or more adjacent cells. For example, as described with respect to FIG. 2B, top and bottom edges of a fourth active region 254 of cell 250 are aligned, along the cell width direction, respectively with top and bottom edges of a fourth adjacent active region 234 of third adjacent cell 230.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 6 is a perspective view of an example element 600 having a fin feature, in accordance with some embodiments. In the example configuration in FIG. 6, IC element 600 is a fin field-effect transistor (FINFET). FINFET 600 comprises a substrate 602, a fin feature (or fin) 604 on substrate 602, a gate dielectric 606 along surfaces of fin 604, and a gate electrode 608 over gate dielectric 606. A source region 610 and a drain region 612 are disposed over substrate 602 on opposite sides of fin 604. Fin 604, source region 610 and drain region 612 belong to an active region (or OD region) which corresponds, in one or more embodiments, to any active region described with respect to FIGS. 1A-3B. In at least one embodiment, gate electrode 608 corresponds to any gate region described with respect to FIGS. 1A-3B. The described configuration of a fin feature in an active region is an example. Other configurations are within the scopes of various embodiments.

In some embodiments, some or all of the methods discussed above are performed by an IC layout diagram generation system. In some embodiments, an IC layout diagram generation system is usable as part of a design house of an IC manufacturing system discussed below.

Figure 7:
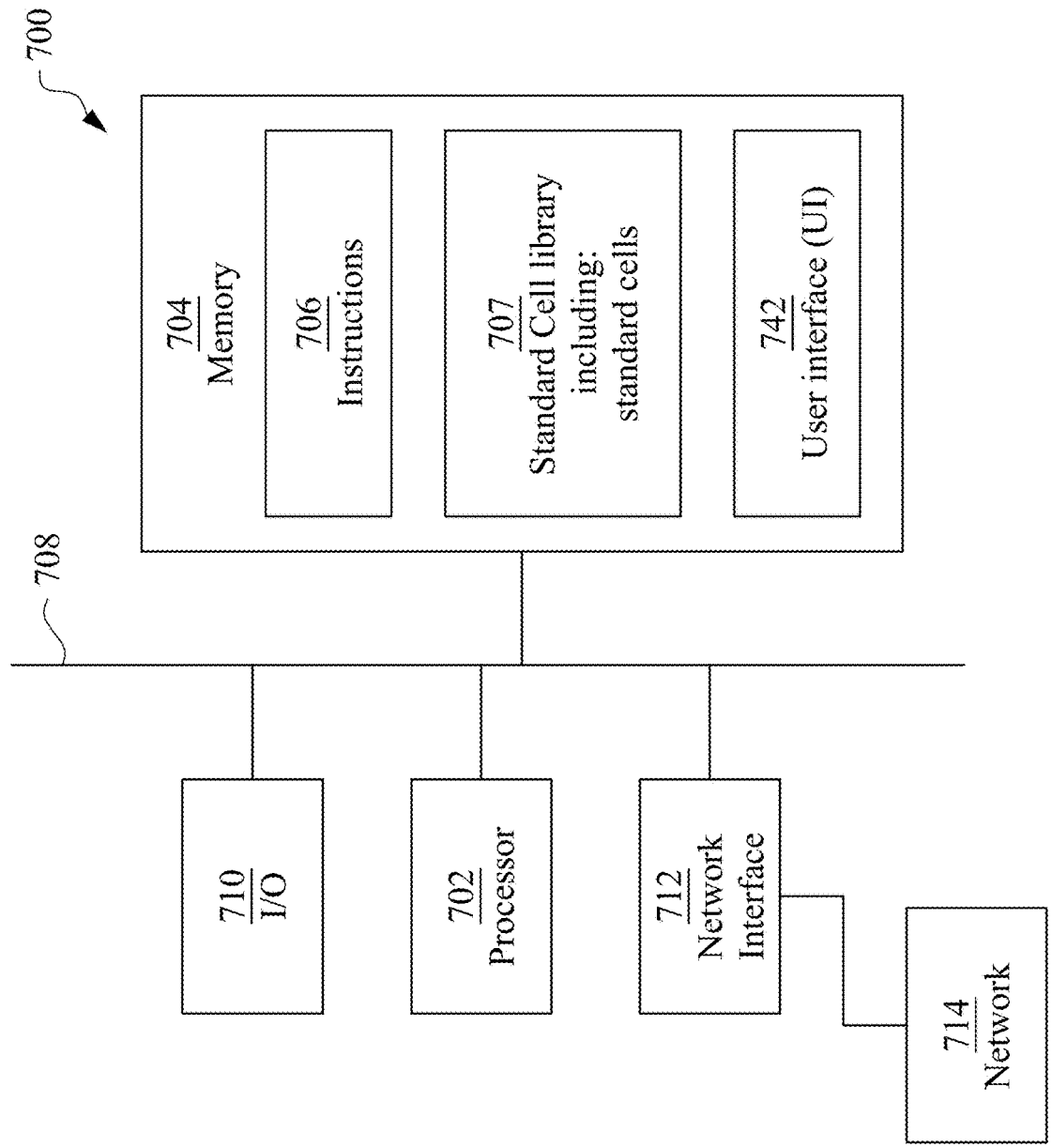
FIG. 7 is a block diagram of an EDA system, in accordance with some embodiments.

FIG. 7 is a block diagram of EDA system 700 in accordance with some embodiments.

In some embodiments, EDA system 700 includes an automated placement and routing (APR) system. Methods described herein of designing layout diagrams and representing wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of, e.g., the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to perform a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to perform a portion or all of the noted processes and/or methods. In one or more embodiments, storage medium 704 also stores information which facilitates performing a portion or all of the noted processes and/or methods. In one or more embodiments, storage medium 704 stores a library 707 of standard cells, including HPC cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
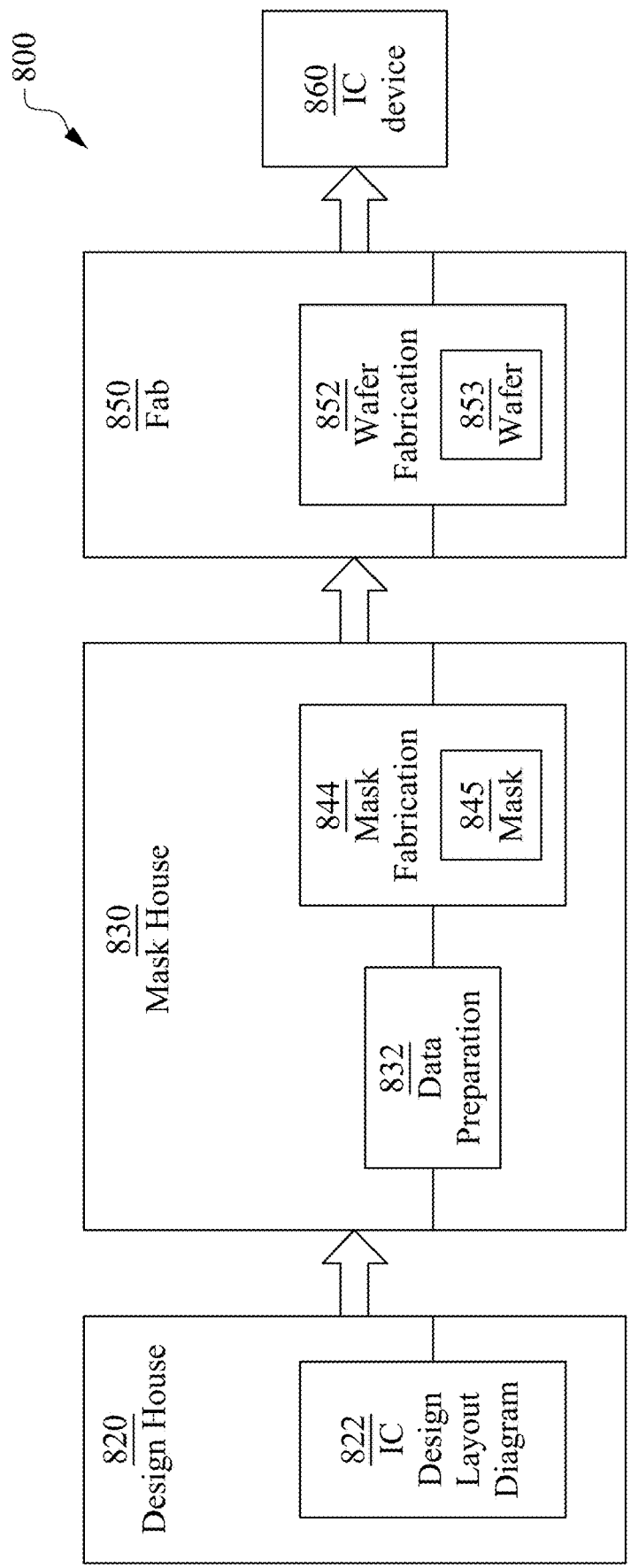
FIG. 8 is a block diagram of an IC manufacturing system and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 is expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method comprises positioning a first active region adjacent to a pair of second active regions in an initial integrated circuit (IC) layout diagram of an initial cell, to align side edges of the first active region and corresponding side edges of each second active region of the pair of second active regions along a cell height direction. The method further includes arranging at least one first fin feature in the first active region, to obtain a modified cell having a modified IC layout diagram. The side edges of the first active region and the corresponding side edges of each second active region extend along the cell height direction. A height dimension of the first active region in the cell height direction is less than half of a height dimension of each second active region of the pair of second active regions in the cell height direction. At least one of the positioning the first active region or the arranging the at least one first fin feature is executed by a processor.

In some embodiments, a system comprises a processor configured to place a cell in an integrated circuit (IC) layout. The processor is configured to align, along a cell width direction, a top edge of a first active region of the cell with a top edge of one active region of a pair of first adjacent active regions of a first one or more adjacent cells, and a bottom edge of the first active region of the cell with a bottom edge of another active region of the pair of first adjacent active regions. A distance in a cell height direction between the top edge of the one active region and the bottom edge of the another active region in the pair of first adjacent active regions is equal to a height dimension of the first active region in the cell height direction. The processor is configured to align, along the cell width direction, a top edge of a second active region of the cell with a top edge of one active region of a pair of second adjacent active regions of a second one or more adjacent cells, and a bottom edge of the second active region of the cell with a bottom edge of another active region of the pair of second adjacent active regions. A distance in the cell height direction between the top edge of the one active region and the bottom edge of the another active region in the pair of second adjacent active regions is equal to a height dimension of the second active region in the cell height direction. The processor is configured to align, along the cell width direction, a top edge of a third active region of the cell with a top edge of a third adjacent active region of one of the first one or more adjacent cells or the second one or more adjacent cells, and a bottom edge of the third active region of the cell with a bottom edge of the third adjacent active region.

In some embodiments, an integrated circuit (IC) device comprises a high performance computing (HPC) cell, and a plurality of adjacent cells. The HPC cell comprises first, second and third active regions. The plurality of adjacent cells is arranged consecutively along a cell height direction, and adjacent to the HPC cell and on a same side of the HPC cell in a cell width direction. A top edge of the first active region of the HPC cell is aligned, along the cell width direction, with a top edge of one active region of a pair of first adjacent active regions respectively belonging to first and second adjacent cells among the plurality of adjacent cells. A bottom edge of the first active region of the HPC cell is aligned, along the cell width direction, with a bottom edge of another active region of the pair of first adjacent active regions. A distance in the cell height direction between the top edge of the one active region and the bottom edge of the another active region in the pair of first adjacent active regions is equal to a height dimension of the first active region in the cell height direction. A top edge of the second active region of the HPC cell is aligned, along the cell width direction, with a top edge of one active region of a pair of second adjacent active regions at least one of which belongs to the second adjacent cell. A bottom edge of the second active region of the HPC cell is aligned, along the cell width direction, with a bottom edge of another active region of the pair of second adjacent active regions. A distance in the cell height direction between the top edge of the one active region and the bottom edge of the another active region in the pair of second adjacent active regions is equal to a height dimension of the second active region in the cell height direction. A top edge of the third active region of the HPC cell is aligned, along the cell width direction, with a top edge of a third adjacent active region belonging to one of the first adjacent cell or the second adjacent cell. A bottom edge of the third active region of the HPC cell is aligned, along the cell width direction, with a bottom edge of the third adjacent active region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device, comprising:
a first active region;
a pair of second active regions adjacent to the first active region, wherein side edges of the first active region and corresponding side edges of each second active region of the pair of second active regions are aligned along a cell height direction; and
at least one first fin feature in the first active region, wherein
the side edges of the first active region and the corresponding side edges of each second active region extend along the cell height direction, and
a height dimension of the first active region in the cell height direction is less than half of a height dimension of each second active region of the pair of second active regions in the cell height direction.

2. The IC device of claim 1, wherein
the pair of second active regions form a first cell,
the first cell and the first active region form a second cell, and
the second cell has a cell height dimension in the cell height direction corresponding to 2.5 times a standard cell height dimension.

3. The IC device of claim 2, wherein
the first cell has a cell height dimension in the cell height direction corresponding to twice the standard cell height dimension.

4. The IC device of claim 2, wherein
the first cell corresponds to a standard cell obtainable from a cell library.

5. The IC device of claim 2, wherein
the second cell corresponds to a standard cell obtainable from a cell library.

6. The IC device of claim 1, wherein
the second active regions of the pair of second active regions are different type active regions, and
the first active region and a closer second active region of the pair of second active regions are different type active regions.

7. The IC device of claim 1, further comprising:
a third active region adjacent to the pair of second active regions, wherein the side edges of the first active region, the corresponding side edges of each second active region of the pair of second active regions, and corresponding side edges of the third active region are aligned along the cell height direction; and
at least one second fin feature in the third active region, wherein
the corresponding side edges of the third active region extend along the cell height direction, and
a height dimension of the third active region in the cell height direction is the same as the height dimension of the first active region in the cell height direction.

8. The IC device of claim 7, wherein
the first and third active regions are on opposite sides of the pair of second active regions along the cell height direction.

9. The IC device of claim 8, wherein
the second active regions of the pair of second active regions are different type active regions,
the first active region and a closer second active region of the pair of second active regions are different type active regions, and
the first active region and the third active region are different type active regions.

10. The IC device of claim 1, wherein
the at least one first fin feature in the first active region configures at least one of a function cell, a physical cell, an engineering change order (ECO) cell, or a filler cell over the first active region.

11. An integrated circuit (IC) device, comprising:
a cell;
first one or more adjacent cells; and
second one or more adjacent cells,
wherein
along a cell width direction,
a top edge of a first active region of the cell is aligned with a top edge of one active region of a pair of first adjacent active regions of the first one or more adjacent cells, and
a bottom edge of the first active region of the cell is aligned with a bottom edge of another active region of the pair of first adjacent active regions,
a distance in a cell height direction between the top edge of the one active region and the bottom edge of the another active region in the pair of first adjacent active regions is equal to a height dimension of the first active region in the cell height direction,
along the cell width direction,
a top edge of a second active region of the cell is aligned with a top edge of one active region of a pair of second adjacent active regions of the second one or more adjacent cells, and
a bottom edge of the second active region of the cell is aligned with a bottom edge of another active region of the pair of second adjacent active regions,
a distance in the cell height direction between the top edge of the one active region and the bottom edge of the another active region in the pair of second adjacent active regions is equal to a height dimension of the second active region in the cell height direction, and
along the cell width direction,
a top edge of a third active region of the cell is aligned with a top edge of a third adjacent active region of one of the first one or more adjacent cells or the second one or more adjacent cells, and
a bottom edge of the third active region of the cell is aligned with a bottom edge of the third adjacent active region.

12. The IC device of claim 11, wherein
the first active region and each active region of the pair of first adjacent active regions are each a first type active region, and
the second active region and each active region of the pair of second adjacent active regions are each a second type active region different from the first type active region.

13. The IC device of claim 12, wherein
the third active region and the third adjacent active region are each a first type active region, or
the third active region and the third adjacent active region are each a second type active region.

14. The IC device of claim 11, wherein
along the cell width direction, the top and bottom edges of the third active region of the cell are correspondingly aligned with the top and bottom edges of the third adjacent active region of one of the second one or more adjacent cells, and
along the cell width direction,
- a top edge of a fourth active region of the cell is aligned with a top edge of a fourth adjacent active region of one of the first one or more adjacent cells, and
- a bottom edge of the fourth active region of the cell is aligned with a bottom edge of the fourth adjacent active region.

15. The IC device of claim 14, wherein
the first active region and each active region of the pair of first adjacent active regions are each a first type active region,
the second active region and each active region of the pair of second adjacent active regions are each a second type active region different from the first type active region,
the third active region and the third adjacent active region are each a first type active region, and
the fourth active region and the fourth adjacent active region are each a second type active region.

16. An integrated circuit (IC) device, comprising:
a high performance computing (HPC) cell comprising first, second and third active regions; and
a plurality of adjacent cells arranged
    consecutively along a cell height direction, and
    adjacent to the HPC cell and on a same side of the HPC cell in a cell width direction,
wherein
a top edge of the first active region of the HPC cell is aligned, along the cell width direction, with a top edge of one active region of a pair of first adjacent active regions correspondingly belonging to first and second adjacent cells among the plurality of adjacent cells,
a bottom edge of the first active region of the HPC cell is aligned, along the cell width direction, with a bottom edge of another active region of the pair of first adjacent active regions,
a distance in the cell height direction between the top edge of the one active region and the bottom edge of the another active region in the pair of first adjacent active regions is equal to a height dimension of the first active region in the cell height direction,
a top edge of the second active region of the HPC cell is aligned, along the cell width direction, with a top edge of one active region of a pair of second adjacent active regions at least one of which belongs to the second adjacent cell,
a bottom edge of the second active region of the HPC cell is aligned, along the cell width direction, with a bottom edge of another active region of the pair of second adjacent active regions,
a distance in the cell height direction between the top edge of the one active region and the bottom edge of the another active region in the pair of second adjacent active regions is equal to a height dimension of the second active region in the cell height direction,
a top edge of the third active region of the HPC cell is aligned, along the cell width direction, with a top edge of a third adjacent active region belonging to one of the first adjacent cell or the second adjacent cell, and
a bottom edge of the third active region of the HPC cell is aligned, along the cell width direction, with a bottom edge of the third adjacent active region.

17. The IC device of claim 16, wherein
the plurality of adjacent cells further comprises a third adjacent cell,
the second adjacent cell is adjacent to and between the first and third adjacent cells, and
one active region of the pair of second adjacent active regions belongs to the second adjacent cell, and the other active region of the pair of second adjacent active regions belongs to the first adjacent cell.

18. The IC device of claim 17, wherein
the HPC cell further comprises a fourth active region having
    a top edge which is aligned, along the cell width direction, with a top edge of a fourth adjacent active region belonging to one of the first adjacent cell or the third adjacent cell, and
    a bottom edge which is aligned, along the cell width direction, with a bottom edge of the fourth adjacent active region.

19. The IC device of claim 16, wherein
both active regions of the pair of second adjacent active regions belong to the second adjacent cell.

20. The IC device of claim 19, wherein
the HPC cell further comprises a fourth active region having
    a top edge which is aligned, along the cell width direction, with a top edge of a fourth adjacent active region belonging to the other one of the first adjacent cell or the second adjacent cell, and
    a bottom edge which is aligned, along the cell width direction, with a bottom edge of the fourth adjacent active region.

* * * * *